March 1, 1932.　　　　W. J. SCOTT　　　　1,847,102
CERAMIC MATERIAL
Filed July 11, 1928

Inventor
Walter J. Scott
by　*Atty.*

Patented Mar. 1, 1932

1,847,102

UNITED STATES PATENT OFFICE

WALTER JEFFERSON SCOTT, OF BROOKFIELD, ILLINOIS, ASSIGNOR TO WESTERN ELECTRIC COMPANY, INCORPORATED, OF NEW YORK, N. Y., A CORPORATION OF NEW YORK

CERAMIC MATERIAL

Application filed July 11, 1928. Serial No. 291,948.

This invention relates to ceramic materials and methods of making the same, and has for its objects the provision of ceramic materials which may be easily molded and which may be converted into articles having high electrical insulating properties, and the provision of simple, expeditious and effective methods of making ceramic materials and articles.

In accordance with the general features of the invention as embodied in one specific form thereof, ceramic substances, such as talc and clay, and water are mixed in proportions to form a mass of a thick liquid consistency and the resulting mass is dried and ground. A temporary binding material, such as paraffin, dissolved in a suitable solvent is added to the mixture and thoroughly mixed therein and at the same time the mixture is heated to evaporate the solvent. The dry mixture of clay, talc and paraffin is then milled to produce a fine powder, the mixture is molded to the desired form and the molded part is heat treated at approximately 2200° F. to remove the paraffin and to harden the ceramic composition.

Figure 1:
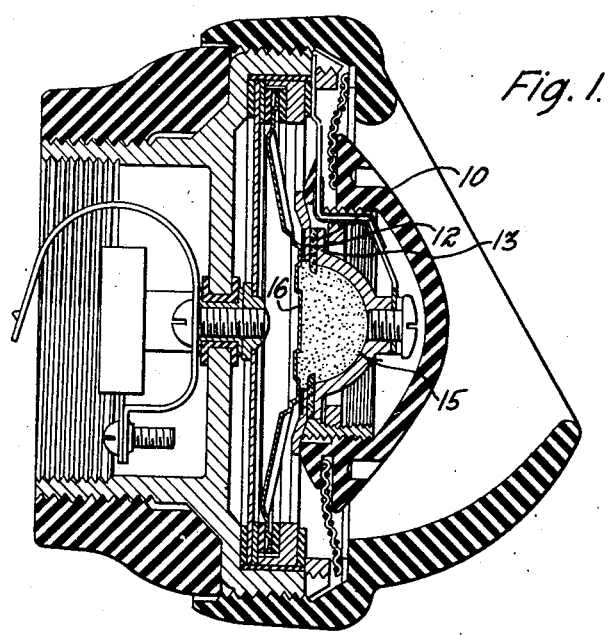
Figure 2:
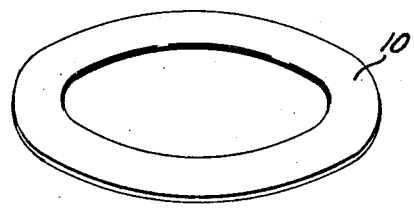

The above enumerated and other objects and features of the invention will be apparent from the following detailed description of one embodiment of the invention taken in conjunction with the accompanying drawings, in which Fig. 1 is a cross-sectional view of a telephone transmitter of an usual type including a part composed of a ceramic material made in accordance with the invention, and Fig. 2 is an enlarged perspective view of the part.

In practicing one method embodying the invention about 75 parts of talc and 25 parts of a suitable clay, such as kaolin, are mixed with a sufficient quantity of water to form a mass of a thick liquid consistency and the resulting mass is dried and ground to a fine powder, after which the ground material is sieved through a 100 mesh screen. An organic temporary binding agent dissolved in a suitable solvent is then added to the dried and ground mixture of talc and kaolin. A suitable solution for this purpose comprises about 16 parts of paraffin dissolved in a non-combustible solvent, such as carbon-tetrachloride. The solution is thoroughly mixed throughout the mixture of talc and kaolin and the resulting mixture is simultaneously heated to evaporate the carbon-tetrachloride. The dry mixture of talc, kaolin and paraffin is then thoroughly milled to reduce the particles to a small size and the resulting mass is screened through a 100 mesh screen.

The finely divided powder produced by the above outlined steps is a very satisfactory molding composition from which ceramic articles may be produced. One satisfactory method of employing the molding composition is to press a quantity of the powder into the desired form in a cold mold by means of a hydraulic press or other suitable apparatus, to trim the molded part, if necessary, to remove projecting fins, and to heat the molded part at a high temperature (about 2200° F.), to remove the paraffin and to harden the ceramic composition.

Since it is difficult to press a dry mixture of talc and kaolin into a desired form, and when parts molded from these or similar materials are held together during the molding operation by a liquid binding agent, such as water, the resulting parts have a great tendency to shrink and warp when the molded parts are heated, a dry, temporary binding agent which is removed when the molded part is subjected to a high temperature, is employed to hold the talc and kaolin in the desired form during the firing operation. Paraffin has proven to be a very satisfactory material to use for this purpose, but other related materials may be used with satisfactory results.

The molding composition described hereinbefore is very suitable for use in the manufacture of so-called "barrier" rings used in some types of telephone transmitters, and a ring made of this composition is illustrated in the accompanying drawings. In utilizing the composition, a ring 10, such as is shown in Fig. 2 of the drawings, is prepared in accordance with the method described hereinbefore and is positioned between electrodes 12 and 13 of a telephone transmitter so that the inner circumference of the ring projects into a mass of granular carbon 15 positioned between the electrodes 12 and 13. Due to its position and shape, the barrier ring causes an electric current flowing from one electrode to the other electrode to traverse a path through the central part of the mass of carbon located between the electrodes. The electrical resistance offered to the passage of the current between the electrodes therefore depends entirely upon the resistance of the carbon particles, which in the operation of the transmitter may be rapidly varied because of the movement transmitted to the carbon particles by a diaphragm 16 which is caused to vibrate by the sound waves entering the transmitter.

Because of the high mechanical strength, high dielectric strength, high insulating resistance at both low and high temperatures, the permanence of the size, shape and electrical properties, and freedom from alteration by atmospheric conditions of ceramic materials produced by the above described method, barrier rings made from the molding composition described hereinbefore give results which are equal to or better than similar rings known to the art and have the additional advantage that they may be cheaply and easily made in the desired shape and size within very close limits.

It is, of course, to be understood that the embodiments of the invention described above are merely useful forms of the invention which illustrate how the invention may be practiced and the scope of the invention is not limitd thereby, but the invention is limited only by the scope of the annexed claims.

What is claimed is:

1. A method of making ceramic molding compositions which consists in mixing ceramic substances with a solution of paraffin, and evaporating the solvent in which the paraffin is dissolved.

2. A method of making ceramic molding compositions which consists in mixing talc and clay with a solution of paraffin, and evaporating the solvent in which the paraffin is dissolved.

3. A method of making ceramic compositions which consists in mixing talc and clay with a solution of paraffin in a non-combustible solvent, and evaporating the solvent.

4. A method of making ceramic molding compositions which consist in mixing talc and clay with a solution of paraffin in carbon-tetrachloride, and evaporating the carbon-tetrachloride.

5. A method of making ceramic molding compositions which consists in mixing about 75 parts talc and 25 parts kaolin with a solution of about 16 parts paraffin in carbon-tetrachloride, and evaporating the carbon-tetrachloride.

6. A method of making articles of ceramic materials which consists in mixing ceramic substances with a solution of an organic temporary binding agent, evaporating the solvent in which the binding agent is dissolved, molding the resulting mass into the desired form, and heating the molded mass at a temperature sufficiently high to remove the binding agent and to harden the ceramic substances.

7. A method of making articles of ceramic materials which consists in mixing talc and clay with a solution of an organic temporary binding agent, evaporating the solvent in which the binding agent is dissolved, molding the resulting mass into the desired form, and heating the molded mass at a temperature sufficiently high to remove the binding agent and to harden the remaining substances.

8. A method of making articles of ceramic material which consists in mixing ceramic substances with a solution of paraffin in carbon-tetrachloride, evaporating the carbon-tetrachloride, molding the resulting mass into the desired form, and heating the molded mass at a temperature sufficiently high to remove the binding agent and to harden the ceramic substances.

9. A method of making articles of ceramic materials which consists in mixing talc and clay with a solution of paraffin in carbon-tetrachloride, evaporating the carbon-tetrachloride, molding the resulting mass into the desired form, and heating the molded mass at a temperature sufficiently high to remove the binding agent and to harden the remaining substances.

10. A method of making articles of ceramic materials which consists in mixing about 75 parts talc and 25 parts kaolin with about 16 parts paraffin dissolved in carbon-tetrachloride and simultaneously evaporating the carbon-tetrachloride, molding the resulting mass into the desired form, and heating the molded mass at a temperature of about 2200° F. to remove the paraffin and to harden the remaining substances.

11. A method of making a ceramic article which comprises mixing clay with a solution of paraffin without the addition of water, bringing the mixture to the desired form, and firing the resulting article.

12. A method of making a ceramic article which comprises mixing an argillaceous material with a solution of paraffin in a non-aqueous solvent, evaporating said solvent from the mixture, bringing the resulting mixture to the desired form, and firing the resulting article to harden the argillaceous material.

13. A method of making an insulator which comprises mixing a finely divided insulating material with a solution of paraffin without the addition of water or of coarse particles, bringing the mixture to the desired form, and heating the resulting article to harden it and remove the paraffin solution therefrom.

14. A method of making a ceramic material which comprises mixing clay and talc with water, drying the mass, grinding the dried mass, mixing the ground material with a solution of paraffin, molding the mixture to a desired form, and firing the resulting article.

In witness whereof, I hereunto subscribe my name this 30th day of June, A. D. 1928.

WALTER JEFFERSON SCOTT.